7854X H. Aiken,
Tool Handle.
Patented Dec. 16, 1833.
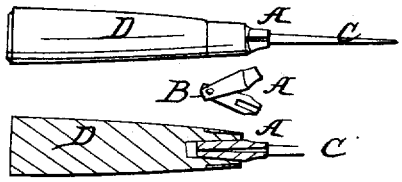
AM. PHOTO-LITHO. CO. N.Y. (OSBORNE'S PROCESS)

Dec. 16. 1833 329

7854X Herrick Aiken.

Letters Patent

The Schedule referred to in these Letters Patent and making part of the same
containing a description in the words of the said Herrick Aiken, him
self of his improvement. being a socket for holding awls & other tools Be it known that I Herrick Aiken of Dracut Middlesex Coun-
ty State of Massachusetts, have made an improvement in the useful
arts being a Socket, for holding awls, and other tools called "Aiken's
Awl Socket" which is described as follows.

This Socket is made of Iron, or other metal in two equal parts.
connected together by a rivet at the small end. Its whole length is 1 1/2
inch. The large end is made square 1/4 inch, the remainder of the length
is made round, 1/2 inch diameter in the largest part, and tapered to
3/16" at the small end. A cavity 3/8" inch in length and 1/8" inch
diameter is made in the shape of a half square, or half round in each
part in the large end to receive the shank of the tool -
The size, and taper may be varied. The socket is to be placed on
a handle which confines the tool in the socket
What I claim as my invention and desire to secure by Letters Patent,
is the before described Socket for holding awls, and other tools — Exd
H.G.

Witnesses
Wm. C. Eliot
Chas Bulfinch Jr.

Herrick Aiken (232 Words)

(Patented December 16. 1833)
[illegible]